US009071300B2

(12) United States Patent
Lu et al.

(10) Patent No.: US 9,071,300 B2
(45) Date of Patent: Jun. 30, 2015

(54) SIGNAL TRANSCEIVER WITH ENHANCED RETURN LOSS IN POWER-OFF STATE

(71) Applicant: Wistron NeWeb Corporation, Hsinchu (TW)

(72) Inventors: Cheng-Hsiung Lu, Hsinchu (TW); Chiung-Wen Hsin, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 0 days.

(21) Appl. No.: 14/281,920

(22) Filed: May 20, 2014

(65) Prior Publication Data

US 2014/0314131 A1 Oct. 23, 2014

Related U.S. Application Data

(63) Continuation-in-part of application No. 13/625,883, filed on Sep. 25, 2012, now Pat. No. 8,836,367.

(30) Foreign Application Priority Data

Jul. 23, 2012 (TW) .............................. 101126466 A
Aug. 6, 2013 (TW) .............................. 102128095 A

(51) Int. Cl.
*H04B 1/38* (2006.01)
*H04B 1/04* (2006.01)
*H04B 1/18* (2006.01)

(52) U.S. Cl.
CPC ................ *H04B 1/0458* (2013.01); *H04B 1/18* (2013.01)

(58) Field of Classification Search
CPC .............. H04B 1/50; H04B 1/18; H04B 1/40; H04B 1/52; H04B 1/005; H04B 1/0458; H04B 1/44; H04B 1/38

USPC .................................. 375/219–220, 257, 315
See application file for complete search history.

(56) References Cited

U.S. PATENT DOCUMENTS

| | | | |
|---|---|---|---|
| 5,583,488 A * | 12/1996 | Sala et al. ................... | 340/568.1 |
| 5,594,372 A | 1/1997 | Shibata | |
| 5,915,212 A * | 6/1999 | Przelomiec et al. ............ | 455/83 |
| 6,035,008 A * | 3/2000 | Kim .............................. | 375/345 |
| 6,507,220 B1 | 1/2003 | Groen | |
| 6,690,202 B1 | 2/2004 | Groen | |
| 6,735,418 B1 * | 5/2004 | MacNally et al. .............. | 455/78 |
| 6,975,848 B2 | 12/2005 | Rawlins | |
| 7,076,266 B2 * | 7/2006 | Sahota .......................... | 455/522 |

(Continued)

FOREIGN PATENT DOCUMENTS

CN 202394070 U 8/2012

*Primary Examiner* — Emmanuel Bayard
(74) *Attorney, Agent, or Firm* — Winston Hsu; Scott Margo

(57) ABSTRACT

A signal transceiver with enhanced return loss in a power-off state includes a connector, a band-pass filter, a front-end module and an impedance transformation circuit. The impedance transformation circuit is coupled between the band-pass filter and the front-end module for transforming an input impedance of the signal transceiver, and includes an input terminal coupled to the band-pass filter for receiving a signal; an output terminal coupled to the front-end module for outputting the signal to the front-end module; an impedance transforming unit; and a power source input circuit coupled to the impedance transforming unit for providing a power source; wherein the impedance transforming unit is coupled between the power source input circuit and the input terminal, for transforming the input impedance of the signal transceiver.

10 Claims, 8 Drawing Sheets

(56) References Cited

U.S. PATENT DOCUMENTS

| | | | |
|---|---|---|---|
| 7,468,638 B1* | 12/2008 | Tsai et al. | 331/126 |
| 7,809,349 B1* | 10/2010 | Granger-Jones et al. | 455/338 |
| 8,331,289 B1* | 12/2012 | Lee et al. | 370/328 |
| 2002/0050866 A1* | 5/2002 | Aki | 331/100 |
| 2002/0142733 A1* | 10/2002 | Nishinakagawa | 455/84 |
| 2002/0190790 A1 | 12/2002 | Cheng | |
| 2004/0111681 A1 | 6/2004 | Lu | |
| 2005/0090245 A1* | 4/2005 | Kim | 455/425 |
| 2005/0245283 A1* | 11/2005 | Boyle et al. | 455/552.1 |
| 2005/0272399 A1* | 12/2005 | Murata | 455/333 |
| 2006/0035600 A1* | 2/2006 | Lee et al. | 455/78 |
| 2006/0187862 A1* | 8/2006 | Lee et al. | 370/294 |
| 2007/0002781 A1* | 1/2007 | Yoon et al. | 370/280 |
| 2007/0047672 A1* | 3/2007 | Kim | 375/329 |
| 2007/0066345 A1* | 3/2007 | Hwang et al. | 455/553.1 |
| 2008/0273579 A1* | 11/2008 | Rofougaran et al. | 375/219 |
| 2009/0253384 A1* | 10/2009 | Gorbachov | 455/83 |
| 2009/0262672 A1* | 10/2009 | Sin et al. | 370/297 |
| 2011/0143685 A1 | 6/2011 | Cebi | |
| 2011/0285528 A1* | 11/2011 | Weinstein et al. | 340/539.11 |
| 2013/0113575 A1* | 5/2013 | Easter | 333/103 |
| 2013/0203364 A1* | 8/2013 | Darnell et al. | 455/77 |
| 2013/0271328 A1* | 10/2013 | Nickel et al. | 343/703 |
| 2013/0278342 A1 | 10/2013 | Yang | |
| 2014/0038663 A1* | 2/2014 | George et al. | 455/550.1 |
| 2014/0038667 A1* | 2/2014 | Little et al. | 455/553.1 |
| 2014/0073268 A1* | 3/2014 | Taniuchi et al. | 455/83 |

* cited by examiner

SIGNAL TRANSCEIVER WITH ENHANCED RETURN LOSS IN POWER-OFF STATE

CROSS REFERENCE TO RELATED APPLICATIONS

This application is a continuation-in-part of, and claims priority under 35 U.S.C. §120 from non-provisional U.S. patent application Ser. No. 13/625,883, entitled "Signal Transceiver and Adaptive Impedance Switch Circuit" filed on Sep. 25, 2012, the subject matter of which is incorporated herein by reference.

BACKGROUND OF THE INVENTION

1. Field of the Invention

The present invention relates to a signal transceiver, and more particularly, to a signal transceiver which provides good return loss when the signal transceiver operates in a power-off state.

2. Description of the Prior Art

Ethernet over Coax (EoC) is a transmission technology in which the Ethernet signals are transmitted over a coaxial cable. The objective of EoC is to connect home appliances or computing devices to the Internet by using the existing cable television infrastructure, wherein the signals transmitted on the cable for EoC should be compatible with the existing cable (or satellite TV) broadcast signals so that data for two different services (i.e. EoC and TV) can be simultaneously transmitted over the same coaxial cable. Among all methods proposed for EoC, the multimedia network standard developed by the multimedia over coax alliance (MoCA) is capable of providing high speed and high quality of service (QoS) functionalities, which are essential for glitch-free streaming media. According to the multimedia network standard, signals can be sent to each client through the existing coaxial cable, and the client only needs a signal transceiver to demodulate the signals transmitted over the cable to obtain the services.

Please refer to FIG. 1, which is a schematic diagram of a conventional signal transceiver 10. The signal transceiver 10 includes a connector 100, a band-pass filter (BPF) 102 and a front-end module 104. Usually, the signal transceiver 10 is implemented with a set-top box (STB). The connector 100 connects a coaxial cable for receiving signals including a MoCA signal, which is transmitted via the coaxial cable. The band-pass filter 102 is utilized for allowing signals within an operational frequency of the signal transceiver 10 to pass while filtering out unwanted signals outside the operational frequency. For example, the range of the frequency band of the MoCA signal provided by the U.S. satellite TV service provider DIRECTV™ is from 475 MHz to 625 MHz. If only the MoCA signal needs to be passed, the frequency range of the band-pass filter 102 should be designed to pass signals from 475 MHz to 625 MHz. The front-end module 104 is utilized for demodulating the signals which have passed through the band-pass filter 102. In general, the front-end module 104, which is usually integrated into an integrated circuit (IC), includes circuits such as a transmitter-receiver, a power amplifier and an attenuator.

Please refer to FIG. 2A and FIG. 2B, which are schematic diagrams of the return loss at the point where a coaxial cable (not shown) connects to the connector 100 when the signal transceiver 10 operates in the power-on state and the power-off state, respectively. As can be seen from FIG. 2A and FIG. 2B, the minimum return loss of the signal transceiver 10 in the power-off state is nearly 7.6 dB, which is 3.4 dB lower than in the power-on state (nearly 11 dB) within the frequency band of 475-625 MHz. Therefore, the system may suffer from performance degradation due to low return loss in the power-off state.

SUMMARY OF THE INVENTION

An objective of the present invention is to provide a signal transceiver which has good return loss in both a power-off state and a power-on state.

An embodiment of the present invention discloses a signal transceiver with enhanced a return loss in a power-off state. The signal transceiver includes a connector for receiving a signal; a band-pass filter coupled to the connector for filtering the signal; a front-end module for de-modulating the signal; and an impedance transformation circuit coupled between the band-pass filter and the front-end module for transforming an input impedance of the signal transceiver. The impedance transformation circuit includes an input terminal, coupled to the band-pass filter for receiving the signal; an output terminal, coupled to the front-end module for outputting the signal to the front-end module; an impedance transforming unit; and a first power source input circuit, coupled to the impedance transforming unit for providing a power source; wherein the impedance transforming unit is coupled between the first power source input circuit and the input terminal for transforming the input impedance of the signal transceiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
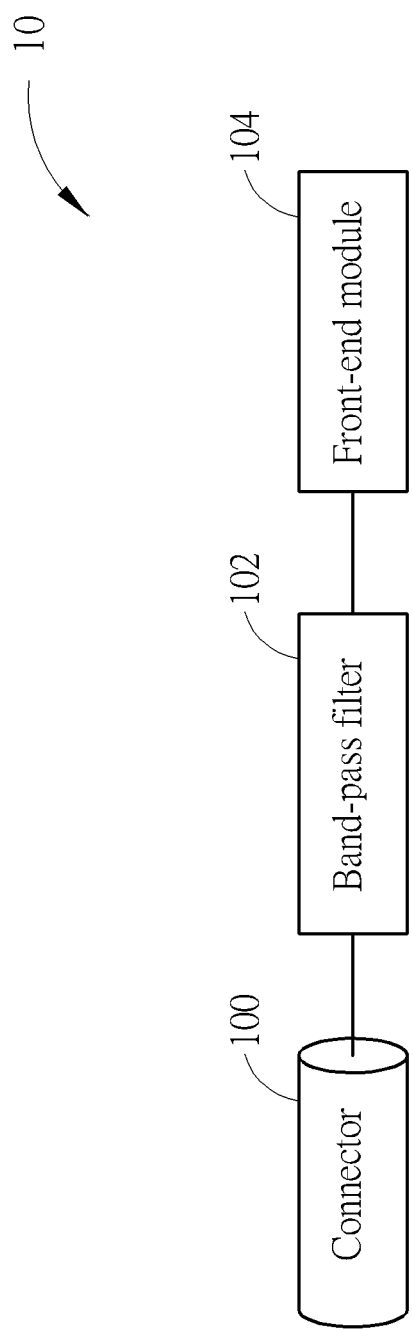
FIG. 1 is a schematic diagram of a conventional signal transceiver.
Figure 2A:
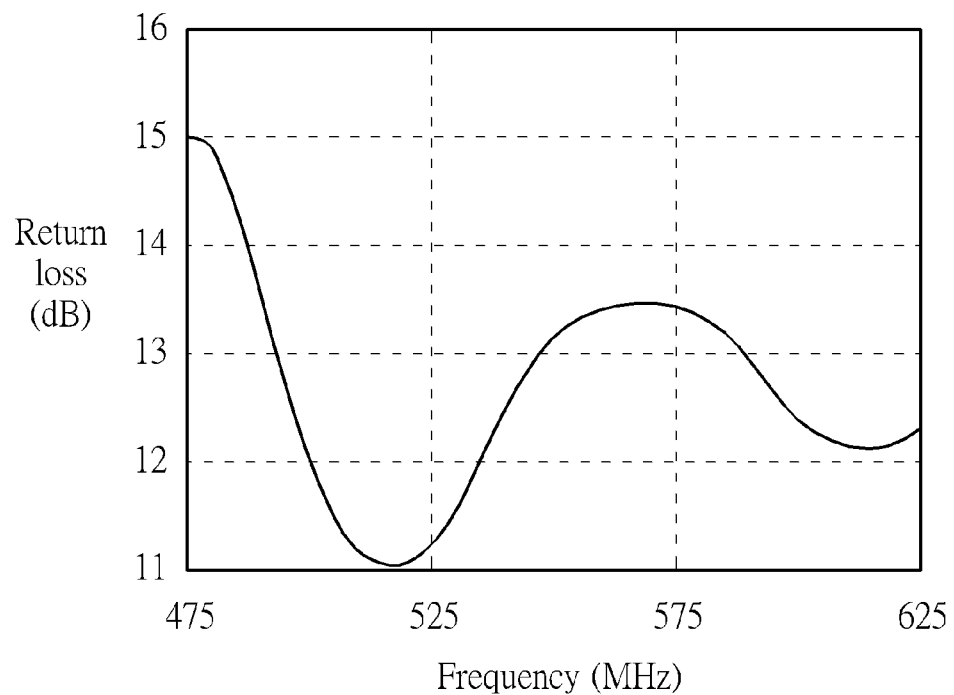
FIG. 2A is a schematic diagram of the return loss at a point between the connector shown in FIG. 1 and a coaxial cable connected to the connector within a specific frequency band when the signal transceiver shown in FIG. 1 operates in a power-on state.
Figure 2B:
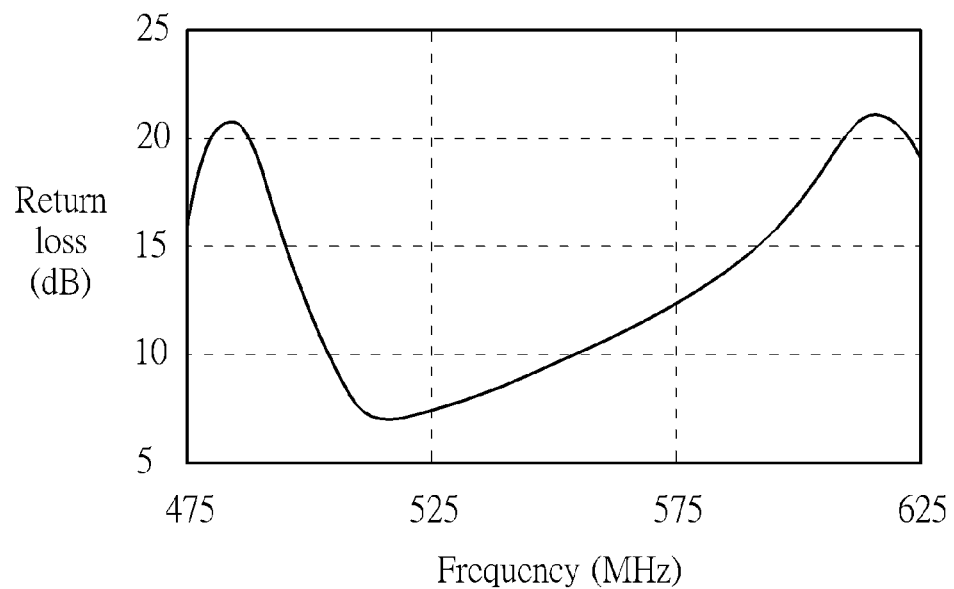
FIG. 2B is a schematic diagram of the return loss at a point between the connector shown in FIG. 1 and a coaxial cable connected to the connector within a specific frequency band when the signal transceiver shown in FIG. 1 operates in a power-off state.
Figure 3:
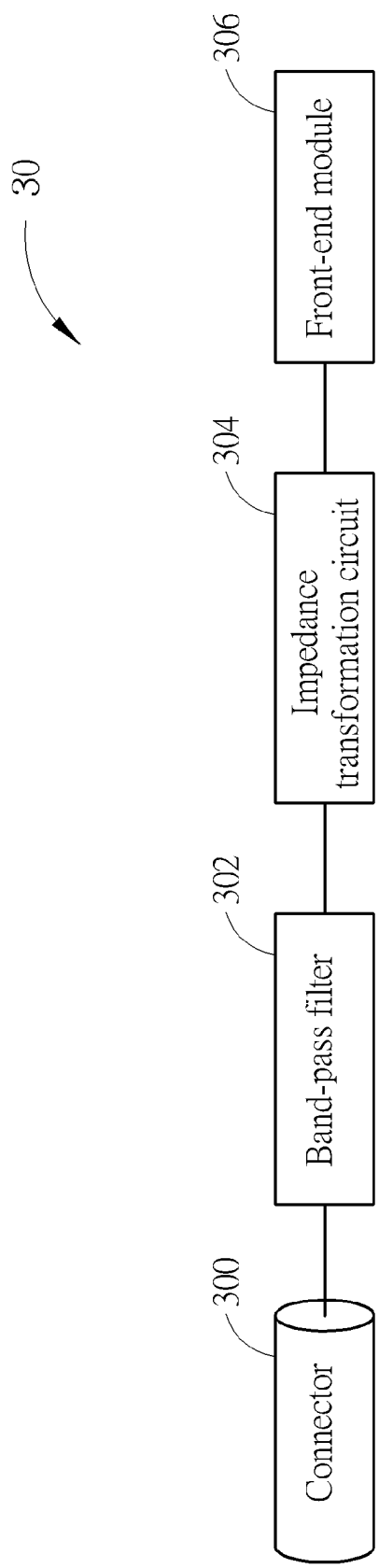
FIG. 3 is a schematic diagram of a signal transceiver according to an embodiment of the present invention.

Please refer to FIG. 3, which is a schematic diagram of a signal transceiver 30 according to an embodiment of the present invention. The signal transceiver 30 includes a connector 300, a band-pass filter (BPF) 302, an impedance transformation circuit 304 and a front-end module 306. The connector 300, the band-pass filter 302 and the front-end module 306 have similar components and functionalities to the ones in the conventional signal transceiver 10; thus, those skilled may vary the connector 300, the band-pass filter 302 and the front-end module 306 to realize different kinds of signal transceivers. The impedance transformation circuit 304, which is coupled between the band-pass filter 302 and the front-end module 306, is utilized for transforming an input impedance of the signal transceiver 30.

Figure 4A:
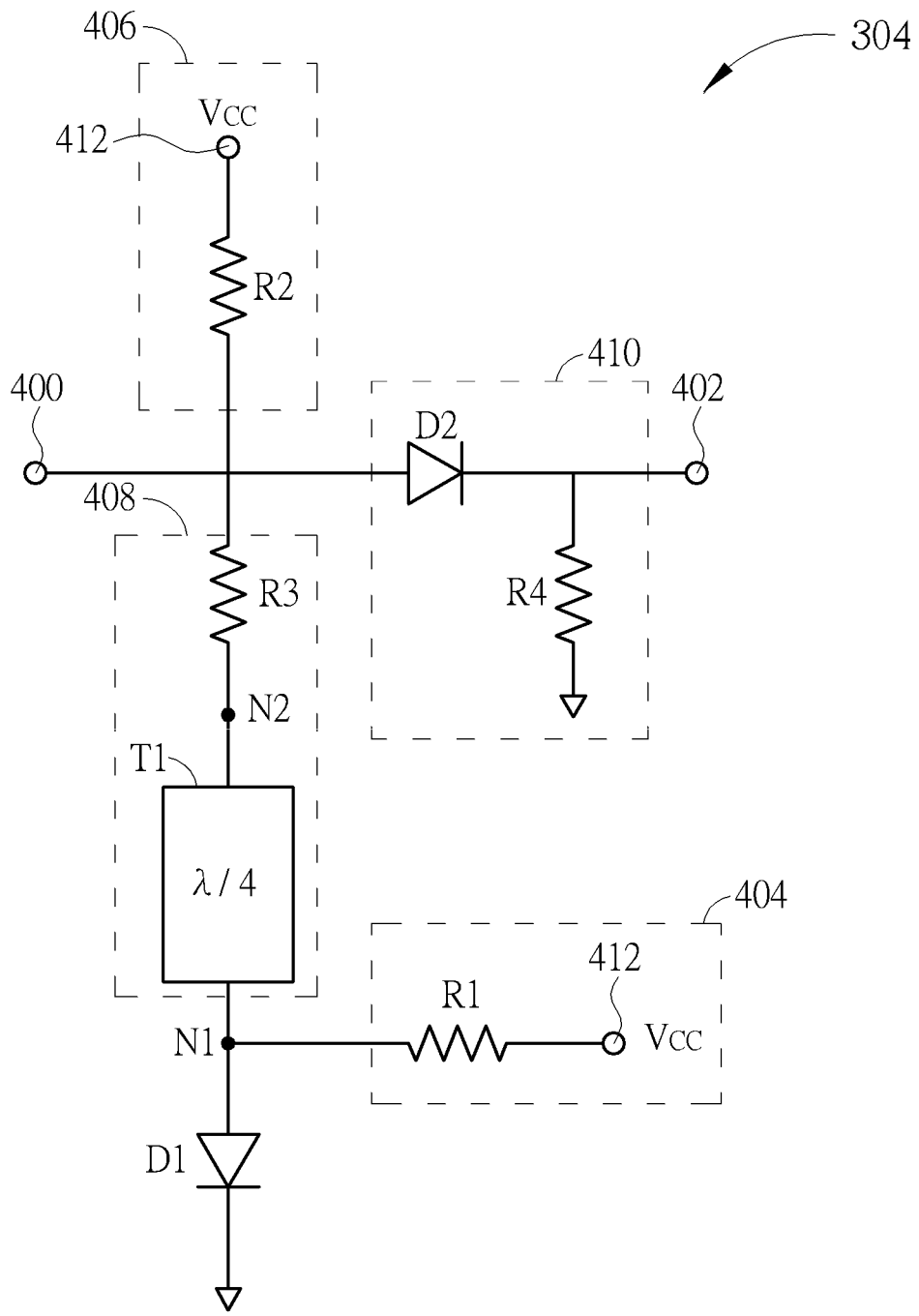
FIG. 4A is a schematic diagram of an impedance transformation circuit shown in FIG. 3.

Please refer to FIG. 4A for an embodiment of the impedance transformation circuit 304 shown in FIG. 3. In FIG. 4A, the impedance transformation circuit 304 includes an input terminal 400, an output terminal 402, power source input circuits 404 and 406, an impedance transforming unit 408, a bias circuit 410 and a switch D1. The input terminal 400 is coupled to the BPF 302 for receiving signals passed through the BPF 302. The output terminal 402 is coupled to the front-end module 306 for delivering the filtered signals to the front-end module 306. The power source input circuits 404 and 406, which are used for providing the input power source Vcc, include resistors R1 and R2, respectively. The resistor R1 is coupled between a power supply 412 and the impedance transforming unit 408, and the resistor R2 is coupled between the power supply 412 and the input terminal 400. The resistors R1 and R2 are both used for establishing a predetermined voltage (i.e. the power source Vcc) for the active components (e.g. the switches) of the impedance transformation circuit 304. The impedance transforming unit 408 includes a transmission line T1 and a resistor R3. One end of the transmission line T1 is connected to the power source input circuit 404. Since the length of the transmission line T1 is substantially a quarter wavelength long of the signal in an operational frequency, the transmission line T1 is used as an impedance transformer to transform the input impedance of the signal transceiver 30 in an operational frequency. The other end of the transmission line T1 is coupled to an end of the resistor R3, and another end of the resistor R3 is coupled to the input terminal 400. The bias circuit 410 is coupled between the input terminal 400 and the output terminal 402 for changing the voltage value of the signal. The bias circuit 410 includes a resistor R4 and a switch D2. The aforementioned switches D1 and D2 can be realized by diodes. The value of the resistor R3 may be determined by a characteristic of an element connected to the connector 300. For example, the resistor value of the resistor R3 maybe substantially equal to the characteristic impedance of the coaxial cable connected to the connector 300 (i.e. 75 Ohm).

Figure 4B:
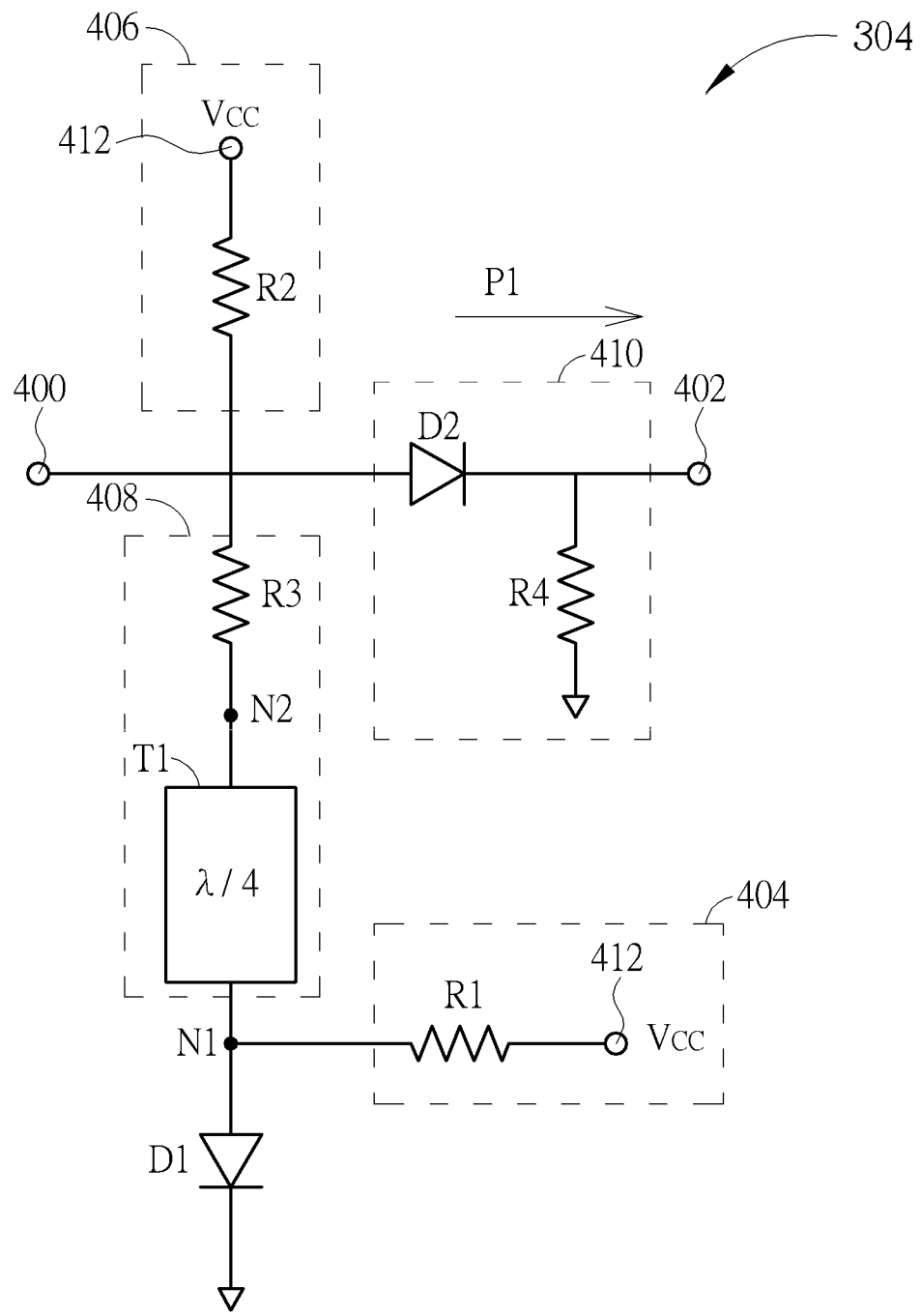
FIG. 4B is a schematic diagram of the current direction in the impedance transformation circuit shown in FIG. 3 when the circuit operates in a power-on state.
Figure 4C:
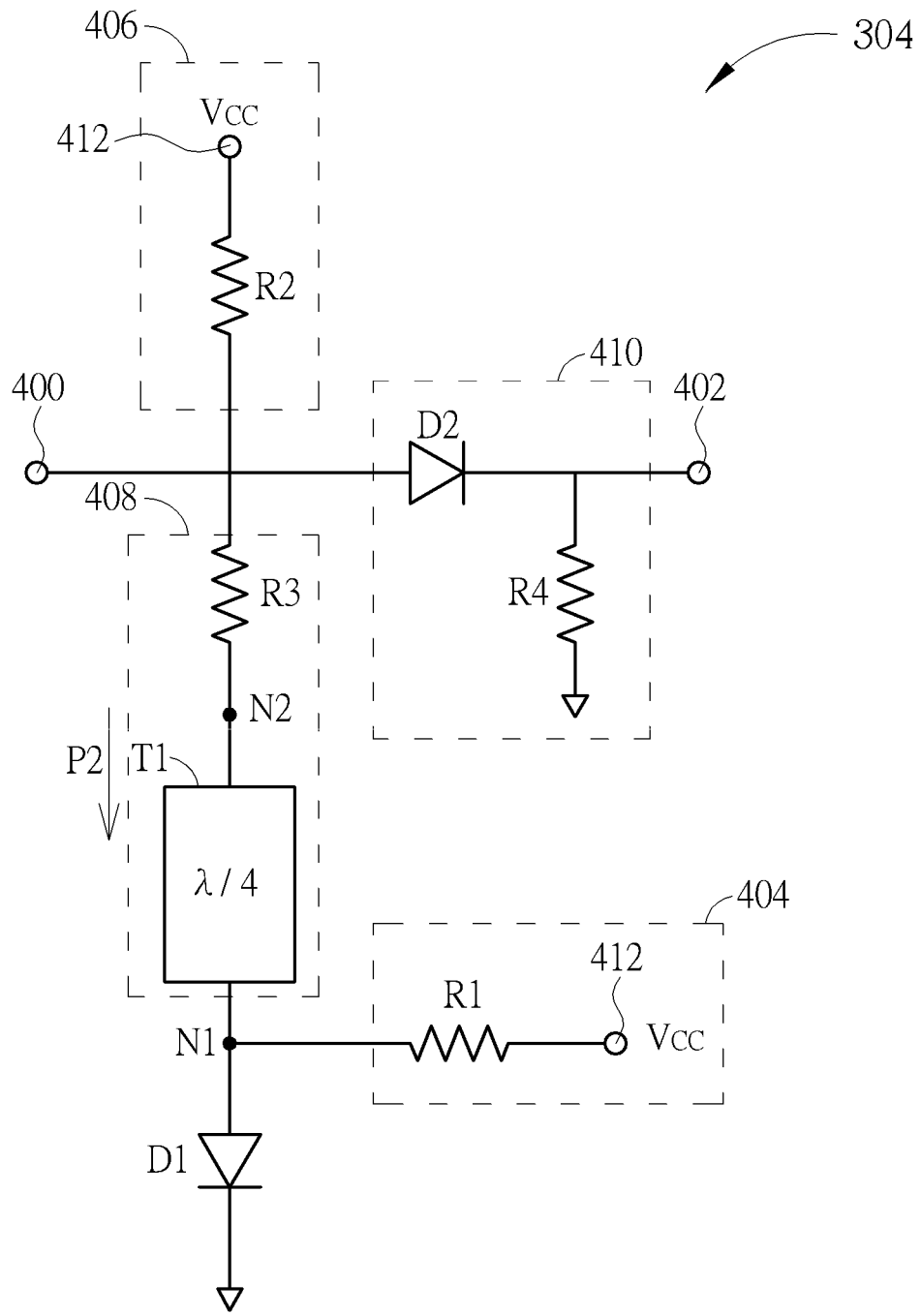
FIG. 4C is a schematic diagram of the current direction in the impedance transformation circuit shown in FIG. 3 when the circuit operates in a power-off state.

FIG. 4B and FIG. 4C illustrate the directions of current flows in the impedance transformation circuit 304 when the signal transceiver 30 operates in a power-on state and a power-off state, respectively. As shown in FIG. 4B, the switches D1 and D2 are conducted in the power-on state. Under such condition, the impedance at the node N1 is equivalent to a short circuit (low impedance). The impedance is transformed by the quarter-wavelength transmission line T1 so that the impedance at the node N2 is equivalent to an open circuit (high impedance). Therefore, the radio signal received from the input terminal 400 flows to the front-end module 306 through the switch D2. The direction of the current flow is shown as the arrow P1 in FIG. 4B. When the signal transceiver 30 operates in a power-off state, however, the switches D1 and D2 are not conducted. Under such condition, the impedance at the node N1 is equivalent to an open circuit (high impedance), and the impedance is transformed by the quarter-wavelength transmission line T1 so that the impedance at the node N2 is equivalent to a short circuit (low impedance). Therefore, the radio signal received from the input terminal 400 flows to the resistor R3 and the transmission line T1 as the arrow P2 shown in FIG. 4C, not to the front-end module 306. In other words, when the signal transceiver 30 operates in the power-off state (i.e. the power source Vcc is off), the input impedance seen by the input terminal 400 is substantially equal to the resistor value of the resistor R3 (e.g. 75 Ohm, if a coaxial cable is used to connect the connector 300). Consequently, the input impedance of the signal transceiver 30 is well-matched, thereby enhancing the return loss of the signal transceiver 30 in a power-off state.

Figure 5A:
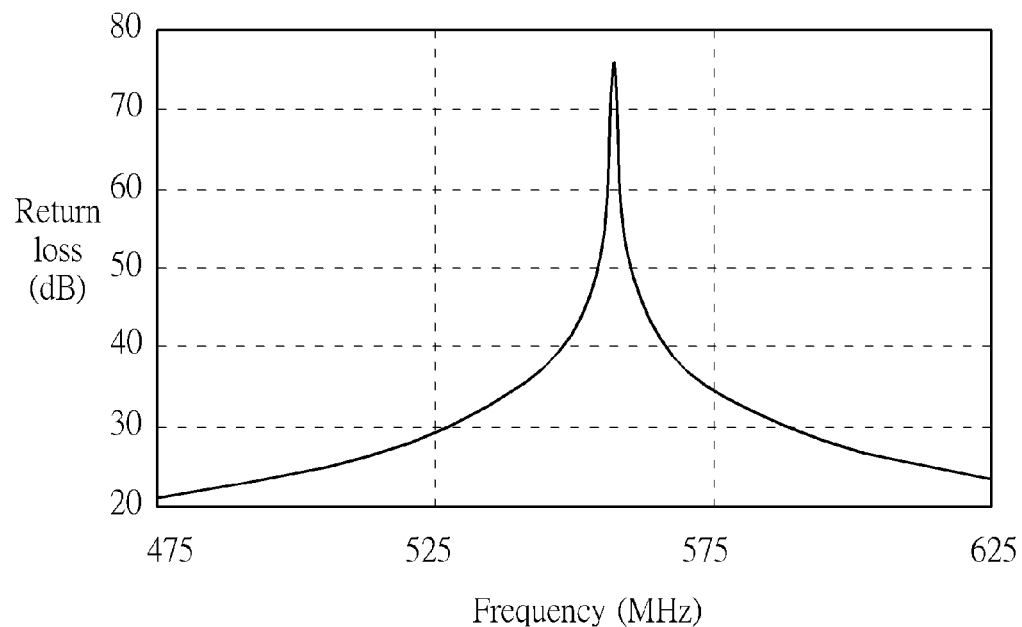
FIG. 5A is a schematic diagram of the return loss between the band-pass filter and the front-end module shown in FIG. 3 within a specific frequency band when the signal transceiver shown in FIG. 3 operates in the power-on state.
Figure 5B:
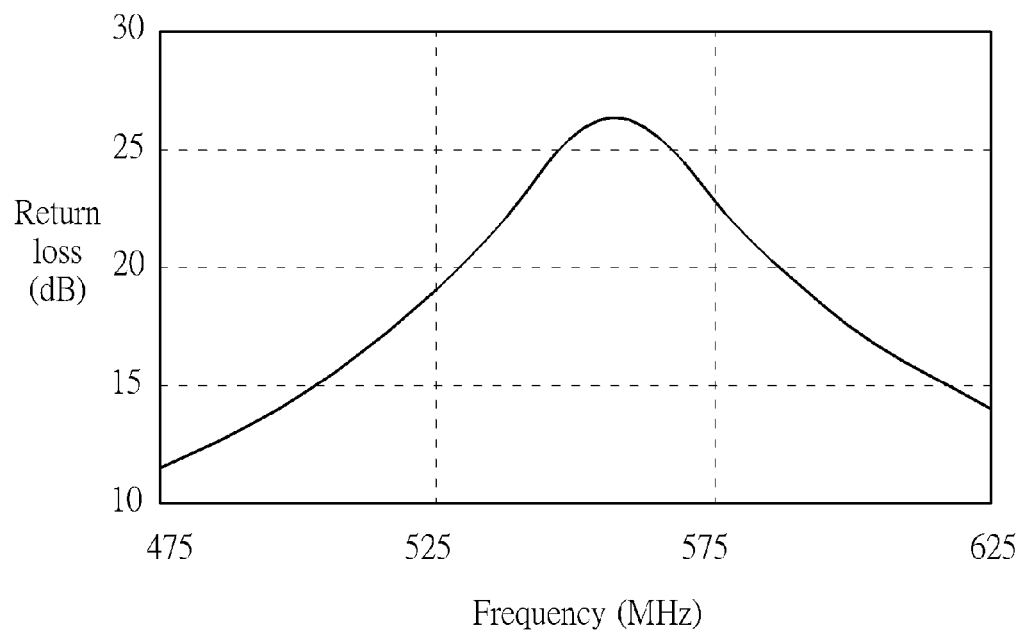
FIG. 5B is a schematic diagram of the return loss between the band-pass filter and the front-end module shown in FIG. 3 within a specific frequency band when the signal transceiver shown in FIG. 3 operates in the power-off state.

Please refer to FIG. 5A and FIG. 5B, which are schematic diagrams of the return loss between the band-pass filter 302 and the front-end module 306 when the signal transceiver 30 operates in the power-on state and power-off state, respectively. FIG. 5A and FIG. 5B show that, within the frequency band 475-625 MHz, the minimum return loss at the input terminal 400 of the signal transceiver 30 is about 20 dB in the power-on state, and the return loss at the input terminal 400 of the signal transceiver 30 is above 12 dB in the power-off state. Hence, the return loss between the band-pass filter 302 and the front-end module 306 is significantly enhanced compared to the prior art.

Figure 6A:
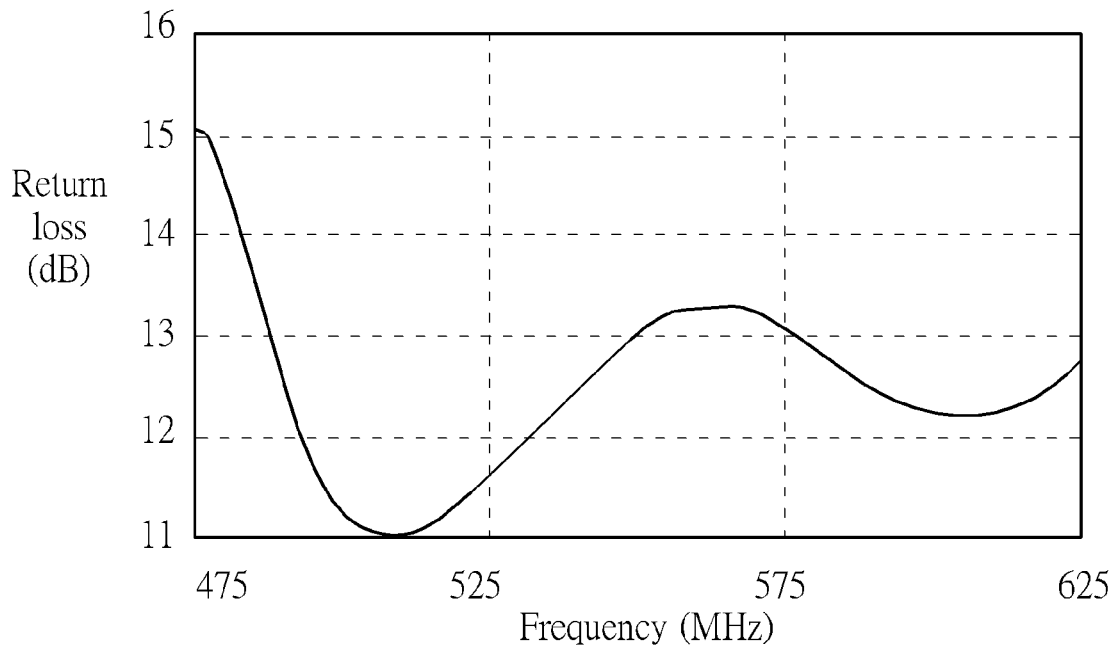
FIG. 6A is a schematic diagram of the return loss of the signal transceiver shown in FIG. 3 in a specific frequency band when the signal transceiver operates in the power-on state.
Figure 6B:
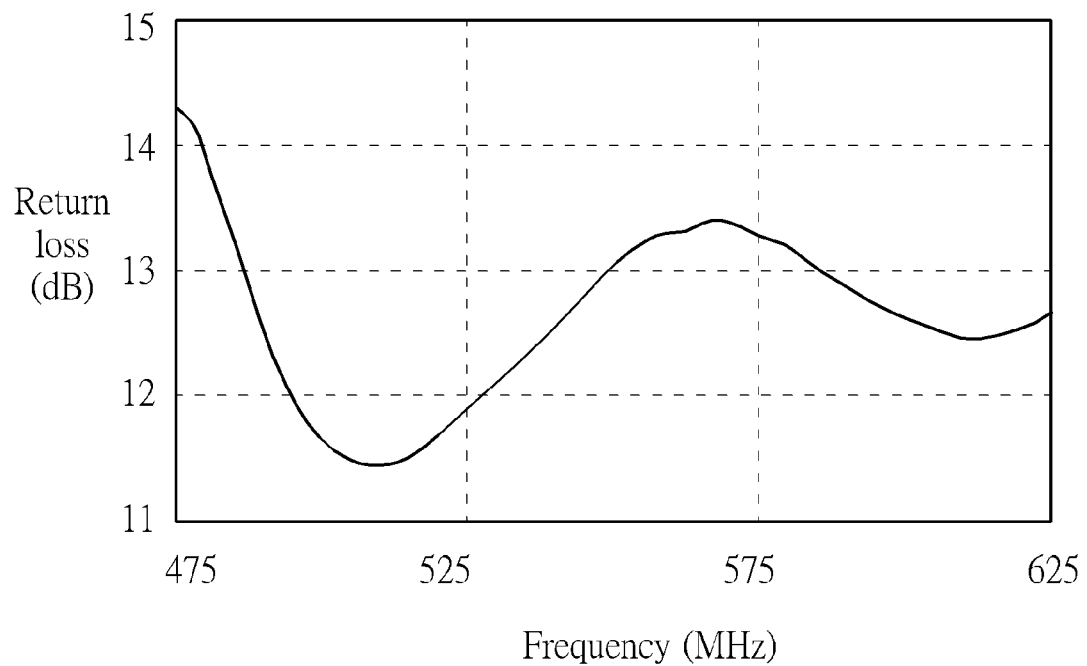
FIG. 6B is a schematic diagram of the return loss of the signal transceiver shown in FIG. 3 in a specific frequency band when the signal transceiver operates in the power-off state.

FIG. 6A and FIG. 6B illustrate the schematic diagrams of the return loss of the signal transceiver 30 when the signal transceiver 30 operates in the power-on state and power-off state, respectively, wherein the input terminal 400 of the impedance transformation circuit 304 in the signal transceiver 30 is connected to the connector 300 with a coaxial cable (not shown). As can be seen from FIG. 6A and FIG. 6B, the minimum return loss of the signal transceiver 30 is about 11 dB when the signal transceiver 30 operates in the power-on state, and the minimum return loss of the signal transceiver 30 is approaching 11.5 dB when the signal transceiver 30 operates in the power-off state. Hence, the signal transceiver 30 of the present invention maintains good return loss in all its operations, no matter which state the signal transceiver 30 is in.

Note that the present invention utilizes an impedance transformation circuit including a transmission line for impedance transformation and connects the impedance transformation circuit between the band-pass filter and the front-end module for enhancing the return loss of signal transceiver, especially for the signal transceiver operating in the power-off state. Those skilled in the art can readily make modifications and/or alternations accordingly. In an example, the characteristic impedance of the transmission line T1 may be determined by an element (e.g. a coaxial cable) connected to the connector 300, but in other examples, the characteristic impedance of the transmission line T1 may be selected according to the impedance of the band-pass filter 302 or other factors, as long as the input impedance is transformed from low impedance (short circuit) to high impedance (open circuit) or from high impedance (open circuit) to low impedance (short circuit) across the transmission line T1. Moreover, the transmission line T1 maybe a microstrip line, a stripline, or coplanar strips, and it may be formed in a straight line, a meandered line or a line with branches. The spacing between two segments of the transmission line T1, if any, may be designed appropriately so that the electrical characteristic of the transmission line T1 is effectively equal to a quarter-wavelength transmission line.

Note that FIG. 5B and FIG. 6B illustrate examples where the minimum return loss of the signal transceiver 30 operating in the power-off state is enhanced within the frequency band 475-625 MHz. Those skilled in the art may adjust the characteristics of each element in the signal transceiver 30 such that the return loss is enhanced for different frequency bands.

In an example, the impedance transformation circuit 304 may be a standalone circuit which couples between the band-pass filter 302 and the front-end module 306. In another example, however, the impedance transformation circuit 304 may be integrated with the front-end module 306 into an integrated circuit.

In the prior art, the return loss of a signal transceiver is reduced significantly when the signal transceiver operates in a power-off state. As a result, the overall system performance of the conventional signal transceiver is undesirable in certain conditions. In comparison, the present invention transforms the impedance between the band-pass filter and the front-end module by using the impedance transformation circuit so as to enhance the return loss when the signal transceiver operates in the power-off state. As such, the system performance of the signal transceiver is good for both the power-on state and the power-off state. In addition, the manufacturing cost of the signal transceiver is reduced by the present invention. Since the impedance transformation circuit of the present invention may be implemented by simple circuit components, the manufacturing cost of the signal transceiver of the present invention can be relatively low, which is favorable for mass production.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transceiver with enhanced return loss in a power-off state, comprising:
    a connector, for receiving a signal;
    a band-pass filter, coupled to the connector for filtering the signal;
    a front-end module, for de-modulating the signal; and
    an impedance transformation circuit, coupled between the band-pass filter and the front-end module for transforming an input impedance of the signal transceiver according to a power state of a power source, comprising:
        an input terminal, coupled to the band-pass filter for receiving the signal;
        an output terminal, coupled to the front-end module for outputting the signal to the front-end module;
        an impedance transforming unit including a first node and a second node; and
        a first power source input circuit, coupled to the first node of the impedance transforming unit for providing the power source;
    wherein an impedance at the first node is equivalent to a short circuit and an impedance at the second node is equivalent to an open circuit when the power source is in a power-on state, and the impedance at the first node is equivalent to the open circuit and the impedance at the second node is equivalent to the short circuit when the power source is in a power-off state.

2. The signal transceiver of claim 1, wherein the impedance transforming unit comprises:
    a transmission line, wherein an end of the transmission line is coupled to the first power source input circuit via the first node, and another end of the transmission line is coupled to the second node; and
    a first resistor, wherein an end of the first resistor is coupled to the input terminal, and another end of the first resistor is coupled to the second node.

3. The signal transceiver of claim 2, wherein the length of the transmission line is substantially a quarter wavelength long of the signal.

4. The signal transceiver of claim 2, wherein a resistor value of the first resistor is determined by a characteristic of an element connected to the connector.

5. The signal transceiver of claim 1, wherein the first power source input circuit comprises:
    a second resistor, coupled between a power supply and the impedance transforming unit.

6. The signal transceiver of claim 1, wherein the impedance transformation circuit further comprises:
    a second power source input circuit, wherein an end of the second power source input circuit is coupled to the input terminal for providing the power source.

7. The signal transceiver of claim 6, wherein the second power source input circuit comprises:
    a third resistor, coupled between a power supply to the input terminal.

8. The signal transceiver of claim 1, wherein the impedance transformation circuit further comprises:
    a bias circuit, coupled between the input terminal and the output terminal for changing a voltage value of the signal.

9. The signal transceiver of claim 8, wherein the bias circuit comprises:
    a first switch; and
    a fourth resistor, wherein an end of the fourth resistor is coupled between the first switch and the output terminal.

10. The signal transceiver of claim 1, wherein the impedance transformation circuit further comprises:
    a second switch, wherein an end of the second switch is coupled between the first node of the impedance transforming unit and the first power source input circuit.

* * * * *